Dec. 28, 1926.                                                                1,612,715
H. D. GEYER ET AL
STEERING WHEEL
Filed April 28, 1925
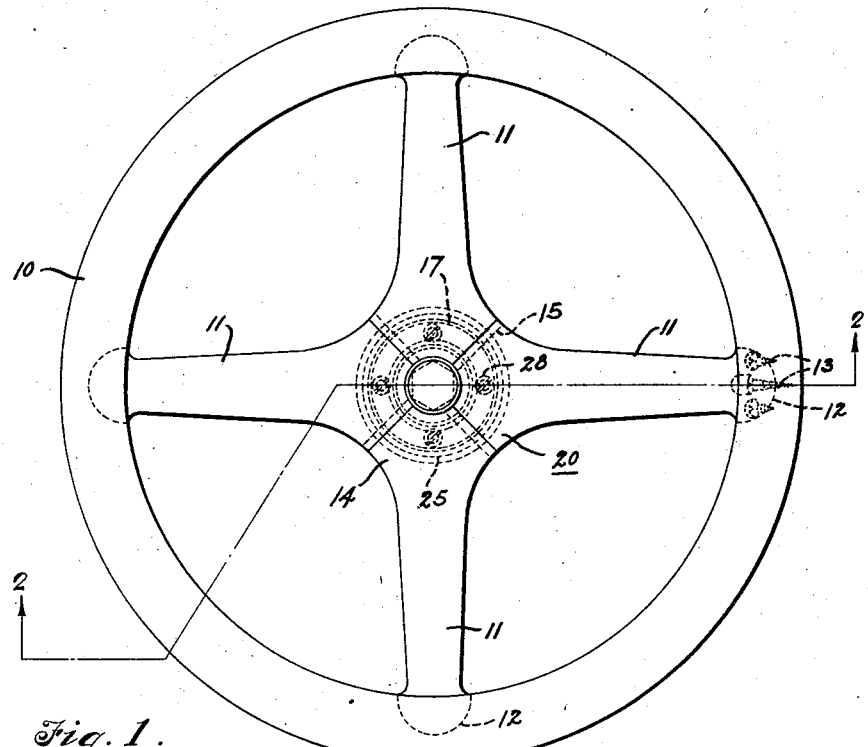
Fig. 1.
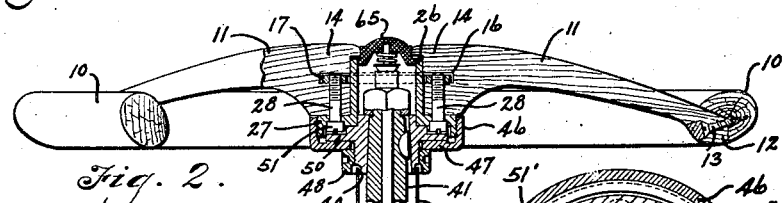
Fig. 2.
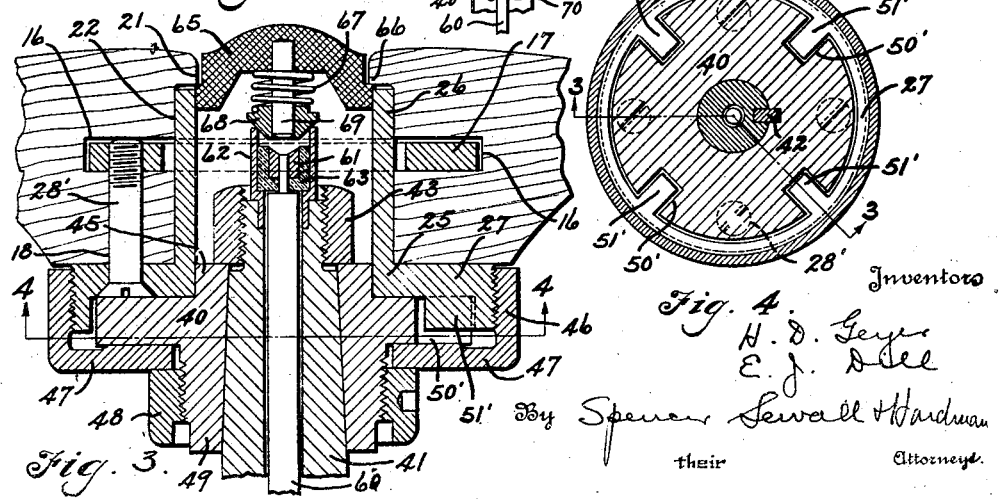
Fig. 3.                                            Fig. 4.
Inventors
H. D. Geyer
E. J. Dell
By Spencer Sewall & Hardman
their Attorneys.

Patented Dec. 28, 1926.

1,612,715

UNITED STATES PATENT OFFICE.

HARVEY D. GEYER AND EDWARD J. DILL, OF DAYTON, OHIO, ASSIGNORS TO THE INLAND MANUFACTURING COMPANY, OF DAYTON, OHIO, A CORPORATION OF DELAWARE.

STEERING WHEEL.

Application filed April 28, 1925. Serial No. 26,421.

This invention relates to handwheels such as are ordinarily used as steering wheels on automotive vehicles.

There is a commercial demand at the present time for automobile steering wheels having wood hub portions, due to the improved appearance of the wood grain over brightly finished or enamelled metal surfaces.

Heretofore however all such steering wheels have had a metal hub inserted within the wood hub and held in place by a flange or plate which overlies and covers up a considerable portion of the wood hub.

An object of this invention is to provide a wood handwheel of greatly improved appearance by concealing the central metal parts used for facilitating the rigid attachment of the wheel to the parts to be driven thereby. A more specific object is to provide a wood steering wheel having a wood hub portion and a non-metallic electric switch button, such as a horn button mounted in a central bore therein, and having a central metal hub which underlies and is concealed from above by the wood hub and button, thereby exposing a continuous wood upper surface on the handwheel proper and a switch button at the center thereof.

Another object is to provide a wood steering wheel having a wood hub and a metal hub portion rigidly secured thereto but underlying the wood hub, and means for rigidly securing this metal hub portion to a second metal hub portion after said second hub portion has been rigidly mounted upon the steering shaft.

Further objects and advantages of the present invention will be apparent from the following description, reference being had to the accompanying drawings, wherein a preferred form of embodiment of the present invention is clearly shown.

In the drawings:

Fig. 1 is a top view of an automobile steering wheel made according to this invention.

Fig. 2 is a section thereof taken on line 2—2 of Fig. 1, but showing the horn switch contact members in elevation.

Figs. 3 and 4 show a slightly modified form.

Fig. 3 is an enlarged view similar to Fig. 2 and taken along line 3—3 of Fig. 4.

Fig. 4 is a section on line 4—4 of Fig. 3.

Similar reference characters refer to similar parts throughout the several views.

Numeral 10 designates the handwheel rim which is made of wood segments in a manner well known in the art and hence will not be described herein.

The four wood spokes 11 have their outer ends 12 shaped as clearly shown in Figs. 1 and 2 and inserted in corresponding recesses in the under side of the wood rim 10 and rigidly held in place by one or more screws 13. In the drawings the central screw 13 is illustrated as extending at an angle more nearly in the plane of rim 10 while the other two screws 13 at each side thereof are shown as extending more nearly in an axial direction. This difference in angle of these attaching screws 13 provides greater strength at the joint between the rim and spokes. The outer ends 12 of the spokes are so shaped to completely fill the recesses in the rim and complete the outline of the rim section, as clearly shown in Fig. 2.

The inner ends 14 of the spokes 11 are flared out both in width and depth and are rigidly joined together by a suitable glued wood joint such as a spline joint, scarf joint, tongue and groove joint, mortice joint, etc. In the drawings a tongue and groove joint 15 has been illustrated. Before the inner ends of the spokes 11 are assembled together and while they are yet shaped out only roughly each spoke is provided with an arcuate recess 16 on the inner ends thereof, as clearly shown in Figs. 2 and 3. The four spokes 11 are then assembled together and rigidly glued together with the metallic ring 17 in place in the circular groove formed by the four arcuate recesses 16 in the four separate spokes. It will be obvious that the enlarged inner ends 14 of the four spokes 11 will thus form a wood hub portion, which will be designated as a whole by numeral 20. This wood hub 20 may now be provided with the central bore 21, the counterbore 22, and the four bolt holes 18 (see Fig. 3), and the outer surface of the roughed out spokes and hub 20 finished off as desired by sanding, etc. The wood spider, thus formed, may now be secured to the rim by the screws 13 as described above, thus completing the wood wheel with the metal ring 17 inserted within the wood hub 20.

The metal hub parts will now be described. First a metal member 25 is rigidly secured to the wood hub 20 and hence this member 25 will be called the wheel hub member to distinguish it from the shaft hub member to be later described, both members being parts of the metal hub. This wheel member 25 comprises an inner sleeve 26 which fits snugly within the counterbore 22 of the wood hub 20 and has a flange 27 underlying the bottom of hub 20. This flange 27 is rigidly clamped to the wood hub 20 by the four (or more) machine bolts 28 which extend through the holes 18 and into threaded engagement with corresponding threaded holes in the metal insert ring 17. It is thus seen that these bolts 28 very rigidly secure the wheel member 25 to the wood wheel, the driving torque being carried from the wood hub to the member 25 by the bolts 28 and also by the clamped relation between the wood hub 20 and the upper surface of flange 27.

The shaft hub member 40 is keyed to the steering shaft 41 by means of key 42 and is also held down over the tapered end of shaft 41 by means of nut 43 threaded to the upper threaded end of shaft 41. This hub member 40 is provided with a boss 45 which fits snugly within the sleeve 26 and thus centers the wheel hub member 25 accurately with the steering shaft 41. The wheel member 25 is held down upon the shaft member 40 by means of a flanged sleeve 46 threaded to the periphery of flange 27, the flange 47 thereof engaging the under side of the shaft member 40. Preferably a lock nut 48 threaded to a depending boss 49 on member 40 is screwed tightly up against the under side of flange 47 thus more securely holding the wheel member 25 and the shaft member 40 together.

In the form of the invention shown in Fig. 2, the torque is transmitted from wheel member 25 to shaft member 40 by providing suitable recesses 50, in the upper surface of member 40 into which the enlarged heads 51 of bolts 28 extend, these bolt heads 51 thus serving as driving lugs between the two members.

In the form shown in Figs. 3 and 4 the bolts 28' are provided with flat heads and this torque is transmitted by depending lugs 51' integral with flange 27, which lugs extend into suitable recesses 50' in the shaft member 40.

The hollow shaft 41 has an insulated conductor 60 leading therethrough and terminating at the upper end thereof in a stationary contact member 61 which is insulatedly mounted upon the upper end of shaft 41 by means of the metallic cup 62 and insulating material 63, all as clearly shown in Fig. 3. The horn button 65 is vertically reciprocable within the sleeve 26 and is urged upwardly against the projecting shoulder 66 formed by the bore 21 in wood hub 20 by means of a coil spring 67. This coil spring 67 is supported from below by the metal guide member 68 which fits upon the top of the cup 62 and it urged in tight engagement therewith by spring 67. The movable contact pin 69 is rigidly secured to horn button 65 and is guided in its vertical movement by extending through a central aperture in the metal guide member 68.

It will now be clear that when the operator depresses horn button 65 against the urge of spring 67 that the movable contact pin 69 will be depressed into engagement with the stationary contact 61. The electric circuit through conductor 60 will then be grounded to the steering shaft 41 through pin 69, metal guide member 68, cup 62, to shaft 41. It is obvious that the movable and stationary contacts may be varied in many ways to suit the conditions in any given case.

The invention lies primarily in providing a wood hub 20 which overlies and conceals from above all parts of the metal hub. The horn button 65 is preferably made of wood or imitation wood which matches the wood of the wood hub 20, however it may be made of other material such as hard rubber, bakelite, etc. It is clear from the drawings that the steering wheel appears to have no metal hub at all since it presents at its upper surface a continuous wood central portion with a relatively small horn button at the center thereof. A steering wheel of very pleasing appearance is thus obtained.

It will be obvious that in assembling the wheel upon the steering shaft that the shaft hub member 40 with the sleeve 46 and lock nut 48 threaded loosely thereupon is secured to the shaft 41 by means of key 42 and nut 43, and the stationary contact members 61, 62, 63 fixed in position. The wheel hub member 25 is fixed to the wood hub 20 entirely independently of the steering shaft, as previously described herein. The horn button 65 and members 67, 68 and 69 are inserted in place within sleeve 26 and the wheel is then set down over the end of the steering shaft and member 40 and turned until the bolt heads 51 (or the driving lugs 51' as the case may be) register with their corresponding recesses in the hub member 40. The flanged sleeve 46 is now screwed upon flange 27 thus firmly clamping the hub member 25 and hub member 40 together. Lastly the lock nut 48 is screwed home upon the boss 49 thus firmly locking all the parts in place. In cases where the steering shaft 41 is housed by a stationary housing tube 70, as shown in Fig. 2, the lock nut 48 and the boss 49 of hub member 40 are preferably grooved out for the reception of the upper end of housing tube 70 (as clearly shown in Fig. 2) and thereby serve as a guide bearing between the rotatable hub and stationary housing.

While the form of embodiment of the present invention as herein disclosed, constitutes a preferred form, it is to be understood that other forms might be adopted, all coming within the scope of the claims which follow.

What is claimed is as follows:

1. A handwheel comprising: a self-sustaining rim, a plurality of wood spokes, and a central metal hub for securing said handwheel to a shaft, said wood spokes overlying and completely concealing said metal hub, whereby no metal hub parts show at the top surface of said handwheel.

2. A handwheel comprising: a wood rim, a wood spider comprising a plurality of wood spokes having their inner ends rigidly joined together to form a wood hub portion, and a metal hub rigidly secured to said wood hub portion and adapted for securing said handwheel to a shaft, said metal hub having all portions thereof lying below the top surface of said wood hub portion, thereby giving a continuous wood surface on the upper surface of said handwheel.

3. A handwheel comprising: a wood rim, a wood spider comprising a plurality of wood spokes having their inner ends rigidly joined together to form a wood hub portion, and a metal hub rigidly secured to said wood hub portion and adapted for securing said handwheel to a shaft, said metal hub comprising: a metal insert in said wood hub portion below the top surface thereof, a metal wheel member lying adjacent the bottom surface of said wood hub portion, clamping means for clamping said wheel member and insert and the intervening wood portion rigidly together whereby said wheel member is rigidly secured to the wood hub portion, a metal shaft member lying entirely below the top surface of said wood hub and adapted to be drivingly secured to a shaft, and means for rigidly securing said wheel member and shaft member together.

4. A handwheel comprising: a wood rim, a wood spider comprising a plurality of wood spokes having their inner ends rigidly joined together to form a wood hub portion, and a metal hub rigidly secured to said wood hub portion and adapted for securing said handwheel to a shaft, said metal hub comprising: a metal insert in said wood hub portion below the top surface thereof, a metal wheel member lying adjacent the bottom surface of said wood hub portion, clamping means for clamping said wheel member and insert and the intervening wood portion rigidly together whereby said wheel member is rigidly secured to the wood hub portion, a metal shaft member lying entirely below the top surface of said wood hub and adapted to be drivingly secured to a shaft, and means for rigidly securing said wheel member and shaft member together after said shaft member has been secured to the shaft.

5. A handwheel comprising: a wood rim, a wood spider comprising a plurality of wood spokes having their inner ends rigidly joined together to form a wood hub portion, an electric switch button mounted in a central bore in said wood hub, a central metal hub rigidly secured to said wood hub for securing said wood hub to a shaft, said wood hub and switch button overlying and concealing from above all portions of said metal hub whereby no metal hub parts are exposed on the upper surface of said handwheel.

6. A handwheel comprising: a wood rim, a wood spider comprising a plurality of wood spokes having their inner ends rigidly joined together to form a wood hub portion, a movable wood button mounted in a central bore in said wood hub, a central metal hub rigidly secured to said wood hub for securing said wood hub to a shaft, said wood hub and wood button overlying and concealing from above all portions of said metal hub whereby only wood surfaces are exposed on the upper surface of said handwheel.

In testimony whereof we hereto affix our signatures.

HARVEY D. GEYER.
EDWARD J. DILL.